United States Patent Office 2,847,136
Patented Aug. 12, 1958

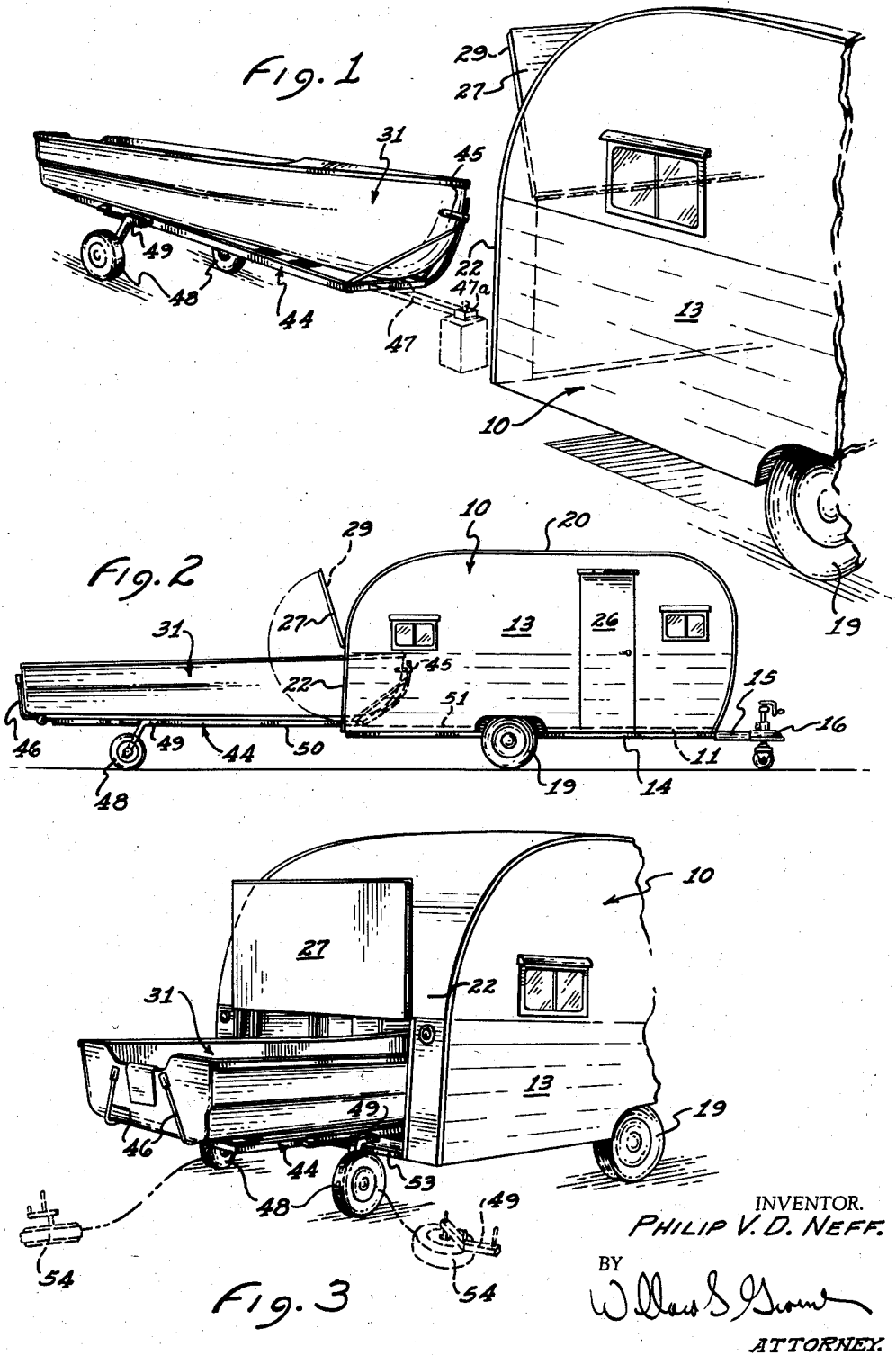

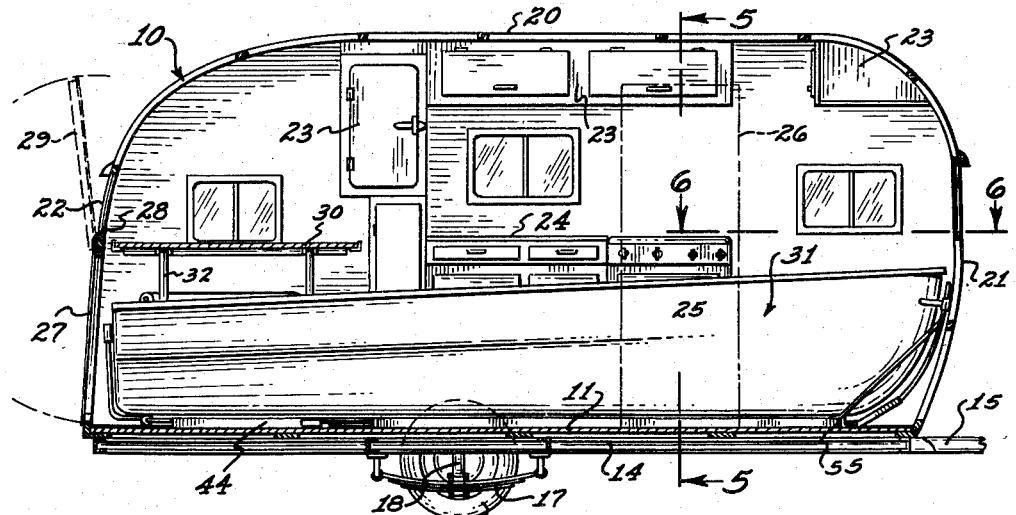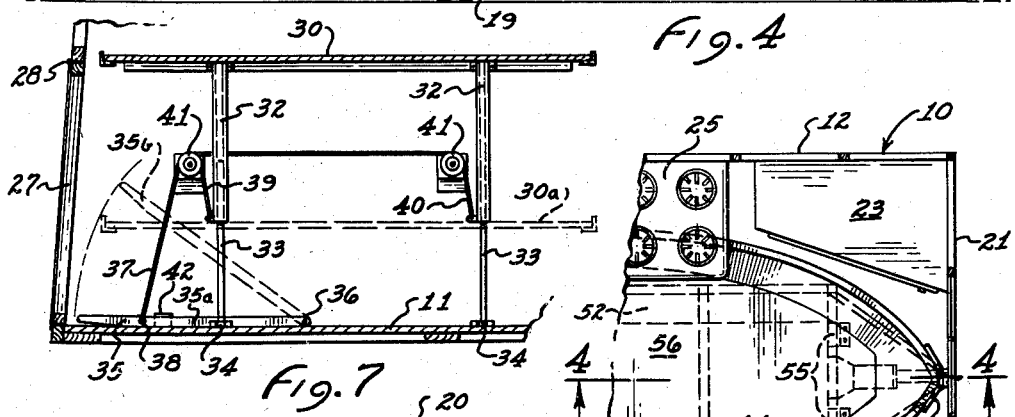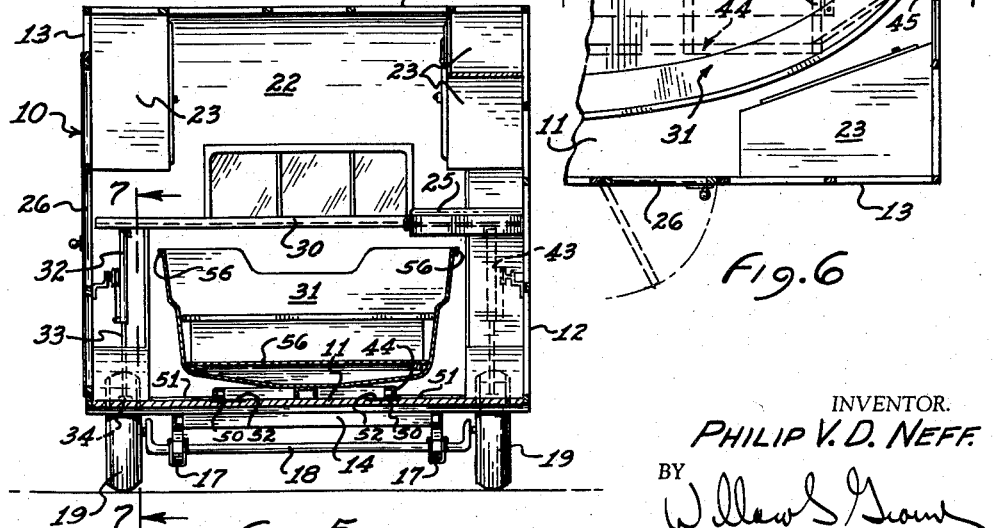

2,847,136

BOAT CARRYING HOUSE TRAILER

Philip V. D. Neff, Tucson, Ariz.

Application December 23, 1957, Serial No. 704,798

4 Claims. (Cl. 214—500)

This invention is directed to an improved boat carrying house trailer and is related to the subject matter covered in my co-pending application Serial No. 433,886, filed June 2, 1954, for boat trailer and house trailer combination, which is now abandoned.

One of the objects of this invention is to provide a better and safer method for carrying a boat in a house trailer while at the same time enabling one person to remove the boat from the house trailer and to launch the boat in a lake or stream without assistance and without the strain of heavy lifting.

Still another object of this invention is to provide a novel cradle for the boat which is arranged in such a way as to convey the boat into and out of the house trailer without lifting so that the desirable features of the normal use of the house trailer are not materially sacrificed.

Still another object of this invention is to provide a cradle for manipulating the boat into and out of the house trailer so constructed that the minimum clearance of the house trailer floor is such that the various kitchen and utility features and the bed, cupboards, etc., of the house trailer are accessible and easily used by the person standing in the boat loaded in the trailer.

Still another object of this invention is to provide means whereby a boat is carried in a cradle which may be slid or skidded into and out of the normal house trailer and in which demountable wheels may be attached to the cradle as the boat is slid out of the house trailer so as to provide a further portable cradle or skid for manipulating the boat, without lifting, into and out of the river or lake, and in which arrangement the user of the trailer may stand inside of the boat when loaded in the house trailer and readily utilize the various cabinets, sinks, stoves and bed without the necessity of removing the boat from the house trailer.

Still another object of this invention is to provide a boat carrying house trailer having the same overall outside dimensions as an ordinary house trailer when traversing the road while at the same time providing substantially completely accessible use of all of the facilities in the house trailer when the boat is loaded therein.

Still another object of this invention is to provide a house trailer having a boat receiving opening at its rear end and to provide bed means raisable and lowerable relative to the floor of the house trailer so that the bed may be utilized at any time whether or not the boat is carried or loaded in the house trailer.

Still another object of this invention is to provide a house trailer with a rear access door to receive and discharge a boat on a cradle or skid rendered portable as the skid is removed from the house trailer and in which there is provided a side entrance for access into the trailer when the boat is loaded or when the boat is not loaded in the trailer in which arrangement the facilities of the house trailer may be readily utilized under either circumstance of loaded or unloaded condition of the boat.

And a still further object of this invention is to provide a boat carrying house trailer including a novel boat supporting cradle for the boat which is arranged in such a way as to facilitate the easy and quick manipulation of the boat into and out of the house trailer portion and which cradle also functions with the attachment of road wheels and a hitch to transport the boat along a road or street, completely independent of the house trailer portion of the device.

Further features and advantages of this invention will appear from a detailed description of the drawings in which:

Fig. 1 is an enlarged fragmentary perspective view showing the boat cradle arranged for launching the boat in the river or lake and for initial insertion into the house trailer.

Fig. 2 is a side elevation showing the boat and cradle being loaded into the house trailer.

Fig. 3 is an enlarged perspective rear view of the house trailer showing the boat and cradle skidded into the house trailer to the point of removal of the portability wheels for final insertion of the boat and cradle in the house trailer.

Fig. 4 is an enlarged longitudinal section on the line 4—4 of Figs. 5 and 6.

Fig. 5 is an enlarged transverse section on the line 5—5 of Fig. 4.

Fig. 6 is an enlarged fragmentary section on the line 6—6 of Fig. 4.

Fig. 7 is an enlarged fragmentary view on the line 7—7 of Fig. 5.

As an example of one embodiment of this invention there is shown a house trailer indicated generally at 10 having a bottom 11 and the sides 12 and 13. The house trailer has the usual chassis 14 and tongue 15 containing the usual trailer hitch 16, the chassis being mounted by the usual springs 17 supported on the axle 18 from the ground wheels 19. The trailer has the usual top 20, the front end 21, and the rear end 22.

Inside of the house trailer is provided the usual cabinets 23, sink 24, stove 25, required for the comfortable and satisfactory housekeeping facilities for the house trailer 10. A side access door 26 is provided in either or both sides 12 and 13 of the trailer 10.

The rear end 22 of the house trailer 10 is provided an access door 27 which is suitably hinged at 28 for swinging upwardly to the open position 29. Immediately behind this access door 27 is the raisable and lowerable platform 30 which serves as a bed or seat or table as desired by appropriately adjusting its position from its lowermost location 30a for sleeping to its raised position 30, Fig. 7, when the boat 31 is loaded into the trailer as will be described. This bed platform 30 is carried on a series of guide posts 32 which telescopically fit over the guide rods 33 fixed at their lower ends 34 to the floor 11 of the trailer 10. A control lever 35 is pivotally mounted at 36 to the house trailer floor 11 or other rigid structure thereof and has connected toward its outer end the lifting cable 37 at the point 38. The lifting cable takes the form of two separate strands 39 and 40 going over idler pulleys 41 fixed to the side or frame structure of the house trailer 10 so that by raising and lowering the control lever 35 from lowered position 35a down to raised position 35b, Fig. 7, the height of the bed pltaform 30 may be raised and lowered relative to the floor 11. An appropriate latch device 42 may be utilized to hold the lever in raised position of the bed platform 30 as shown in Fig. 7 and it is understood that such lifting mechanism is provided at both ends such as at 43, Fig. 5, of the bed support structure.

In order to load the boat 31 into and out of the trailer 10 there is provided a cradle or skid 44 which appropriately receives and holds the boat 31 by suitable guide supports 45 and 46 for securing the boat to the cradle 44. The cradle may also be provided with a detachable tongue 47 having the usual hitch 47a and demountable road wheels 48 connectable and disconnectable by suitable supporting brackets 49 so that the boat 31 on the cradle 44 may be readily manipulated to and from the lake or river for launching and removal of the boat without lifting from the water surface. Having thus applied the boat 31 to the cradle 44 with the wheels 48 mounted thereon as shown in Fig. 1, the tongue 47 is then removed and the front portion of the cradle rested with its bottom surfaces 50 functioning as a skid slidable on the top surface 51, preferably of suitable skid bars 52 fixed to the bottom 11 of the trailer 10. By this structure of the sliding action of the surfaces 50 on the iron slide bars 52 together with the wheels 48 functioning at this time provides very easy means for pushing the boat through the access opening provided by the door 27 when in raised position 29 to load the cradle and boat into the house trailer.

The cradle and boat are pushed in to the position shown in Fig. 3 where the wheels come up against the rear bottom edge 53 of the trailer at which time the entire load of the cradle and boat are then being supported on the skid bars 52 on the bottom of the trailer 10. The brackets 49 and wheels 48 then may be readily removed by suitable means (not shown) and set aside at the position 54 so as to provide a continuous smooth surface for the bottoms 50 of the cradle 44 so that the boat may now be pushed all the way in to the trailer as shown in Figs. 4 and 6. Suitable clamp devices 55 of any satisfactory character may be used to thus lock the cradle 44 to the floor of the trailer and the door 27 then closed. It is obvious that the reversal of this process may be readily accomplished without in any way lifting the total weight of the cradle and boat and with a minimum of horizontal effort being applied to slide the boat again back out, attach the wheels as in Fig. 3, and finally wheel the boat clear out to its position shown in Fig. 1 ready for launching in the stream.

It will be further noted that the cabinets 23, sink 24, and stove 25, and other equipment have been arranged upwardly and partially overhanging the upper edges 56 of the boat when loaded, note Fig. 5, and that the bed platform 30 may be moved to its raised position, Figs. 4 and 7, and also as shown in Fig. 5 so that the boat may be readily placed in the trailer without interfering with these elements of the house trailer structure. It is very important to note, however, that by means of the side access door 26 the operator of the vehicle with the boat loaded therein may readily step into the house trailer and into the boat on its floor 56 which is substantially at the floor level 11 of the house trailer itself so that maximum clearance is provided for full standing room under the top 20 of the house trailer while at the same time all of the cabinets, sink, stove and bed are still fully available to use of the operator of the vehicle. Thus not only can the boat be loaded by one person into and out of the trailer by the means described without any lifting thereof but the trailer is also fully available with the boat loaded therein for access to the various facilities and sleeping quarters of the trailer. Thus a compact overall trailer no larger than a standard house trailer, while still accommodating a full size boat and still providing full access to the facilities in the trailer is provided.

While the apparatus herein disclosed and described constitutes a preferred form of the invention, it is also to be undertood that the apparatus is capable of mechanical alternation without departing from the spirit of the invention and that such mechanical arrangements and a commercial adaptation as fall within the scope of the appendant claims are intended to be included herein.

Having thus fully set forth and described this invention what is claimed and desired to be obtained by United States Letters Patent is:

1. In a boat carrying house trailer structure including a house trailer having a bottom and sides connected to said bottom, cabinets, sink, stove and sleeping facilities carried on said sides and bottom, ground wheels to support said house trailer, a rear access door in said house trailer, a cradle to portably support a boat demountably carried thereon, demountable road wheels on said cradle, removable when said cradle and boat are fully slid into said house trailer and attachable when said cradle is partially slid out therefrom and while supported by the floor of said house trailer, said road wheels serving to facilitate transporting said boat and cradle to and from the launching site when removed completely from said house trailer.

2. In a boat carrying house trailer as set forth in claim 1 wherein an access door is provided in a sde of said house trailer so that a user of said trailer may enter and leave and utilize the full housekeeping facilitities of said trailer with the boat fully loaded therein as described.

3. The combination in a house trailer having a bottom, a cradle to demountably support a boat thereon, skid surfaces on the bottom of said cradle slidably engaging the bottom of said house trailer, road wheels mounted on said cradle intermediate the ends thereof adapted to be moved to provide uninterrupted bottom slide surfaces on said cradle for full insertion in said house trailer, said wheels being positionable on said cradle when partially withdrawn from the bottom of said house trailer while said bottom still supports said cradle and to provide means to facilitate transportation of said cradle and boat to a launching site.

4. The combination of a house trailer, ground wheels on said trailer, a bottom in said trailer, sides on said trailer, housekeeping facilities on the sides and bottom of said trailer, a cradle, a boat demountably carried on said cradle, road wheels mounted intermediate the ends of said cradle to cooperatively support said cradle in conjunction with the support of the forward portion of said cradle by the floor of the trailer during the initial loading and unloading of said cradle slidably on the floor of said trailer.

No references cited.